United States Patent
Jiang et al.

(10) Patent No.: US 12,397,394 B1
(45) Date of Patent: Aug. 26, 2025

(54) METHOD AND DEVICE FOR DETERMINING PARAMETERS OF NEAR-SURFACE DIELECTRIC LAYER IN WAFER GRINDING SCENE

(71) Applicant: BEIJING TSD SEMICONDUCTOR CO., LTD., Beijing (CN)

(72) Inventors: Jile Jiang, Beijing (CN); Weitao Meng, Beijing (CN); Huiyan Zhou, Beijing (CN)

(73) Assignee: BEIJING TSD SEMICONDUCTOR CO., LTD., Beijing (CN)

( * ) Notice: Subject to any disclaimer, the term of this patent is extended or adjusted under 35 U.S.C. 154(b) by 0 days.

(21) Appl. No.: 19/060,863

(22) Filed: Feb. 24, 2025

Related U.S. Application Data

(63) Continuation of application No. PCT/CN2024/135875, filed on Nov. 29, 2024.

(30) Foreign Application Priority Data

May 29, 2024 (CN) .......................... 202410682451.1

(51) Int. Cl.
*B24B 49/12* (2006.01)
*B24B 37/013* (2012.01)
(Continued)

(52) U.S. Cl.
CPC ............ *B24B 49/12* (2013.01); *B24B 37/013* (2013.01); *B24B 37/044* (2013.01); *B24B 49/04* (2013.01); *G01B 11/0625* (2013.01)

(58) Field of Classification Search
CPC ......... B24B 49/12; B24B 49/02; B24B 49/04; B24B 49/045; B24B 49/05; B24B 49/00; B24B 49/10; B24B 49/105; B24B 37/013; B24B 37/00; B24B 37/005; B24B 37/04; B24B 37/042; B24B 37/044; B24B 37/10;
(Continued)

(56) References Cited

U.S. PATENT DOCUMENTS

| 6,991,514 B1* | 1/2006 | Meloni | B24B 37/013 |
| | | | 451/6 |
| 2009/0130955 A1* | 5/2009 | Na | B24B 37/345 |
| | | | 451/6 |

(Continued)

FOREIGN PATENT DOCUMENTS

CN 116766042 A 9/2023

*Primary Examiner* — David S Posigian
*Assistant Examiner* — Michael A Gump
(74) *Attorney, Agent, or Firm* — George D. Morgan

(57) ABSTRACT

The present invention provides a method and device for determining parameters of a near-surface dielectric layer in a wafer grinding scene. The method includes: obtaining a measured spectrum in a state in which a surface of a wafer has a first layer and a second layer, where the wafer includes a wafer substrate and a wafer film, parameters of the wafer substrate and the wafer film are known parameters measured in advance, and the second layer is located between the first layer and the wafer film; generating theoretical spectra under different given parameters of the second layer using a spectrum computation model with parameters of the first layer and the second layer; and determining a parameter range of the second layer based on the theoretical spectra and the measured spectrum.

11 Claims, 2 Drawing Sheets

(51) Int. Cl.
   *B24B 37/04*         (2012.01)
   *B24B 49/04*         (2006.01)
   *G01B 11/06*         (2006.01)
(58) Field of Classification Search
   CPC ....... B24B 37/205; B24B 37/22; B24B 37/12;
              B24B 7/228; B24B 51/00; B24B 1/002;
              G01B 11/0625
   USPC .................................................. 451/5, 6, 41
   See application file for complete search history.

(56)            References Cited

U.S. PATENT DOCUMENTS

2010/0184357 A1*  7/2010  Qian ................... B24B 37/013
                                                                 451/6
2014/0242881 A1*  8/2014  David ................... B24B 49/12
                                                                 451/5

* cited by examiner

METHOD AND DEVICE FOR DETERMINING PARAMETERS OF NEAR-SURFACE DIELECTRIC LAYER IN WAFER GRINDING SCENE

CROSS-REFERENCE TO RELATED APPLICATIONS

The application claims priority to Chinese patent application No. 202410682451.1, filed on May 29, 2024, the entire contents of which are incorporated herein by reference.

TECHNICAL FIELD

The present invention relates to the field of wafer parameter measurement, and in particular, to a method and device for determining parameters of a near-surface dielectric layer in a wafer grinding scene.

BACKGROUND

In wafer manufacturing, with the upgrade of manufacturing technology and the reduction of wire and gate sizes, lithography technology has increasingly higher requirements for non-uniformity of a wafer surface, while the chemical mechanical polishing (CMP) technology has been widely applied in wafers in recent decades. The CMP requires very high polishing accuracy, and in order to meet accuracy requirements, it is necessary to accurately measure the thickness of a wafer film. Due to the complexity of the CMP processing environment, existing technologies in the prior art cannot achieve optical non-contact in-situ real-time measurement of wafer films, and can only remove a wafer from the CMP for off-line measurement and other endpoint measurement, while the endpoint measurement can only detect a grinding endpoint, but cannot carry out real-time measurement.

When implementing embodiments of the present invention, the inventor found that in the optical non-contact in-situ real-time measurement of a wafer film, various dielectrics exist between the wafer and the probe, such as glass, PU, and slurry. Under the influence of these dielectrics, a "deformation" phenomenon will occur in a reflectance spectrum, but a theoretical spectrum of a to-be-measured film (a wafer film) in the prior art cannot describe this "deformation" phenomenon, thus leading to the fact that the exact thickness of the to-be-measured film cannot be accurately measured in the prior art.

According to the deformed spectrum, the inventor found during in-situ measurement of film thickness of a wafer that there was a near-surface structure layer on the wafer, and the near-surface structure layer caused the spectrum deformation phenomenon. The thickness of the near-surface dielectric layer affects the accuracy of the theoretical spectrum of the to-be-measured film under the "deformation" phenomenon, which further affects the accuracy of measuring the thickness of the to-be-measured film in a complex environment. Therefore, how to determine the film thickness of the near-surface dielectric layer is an urgent technical problem to be solved in the prior art.

SUMMARY

In view of the foregoing, the present invention provides a method for determining parameters of a near-surface dielectric layer in a wafer grinding scene, including the following steps:

obtaining a measured spectrum in a state in which a surface of a wafer has a first layer and a second layer, where the wafer includes a wafer substrate and a wafer film, parameters of the wafer substrate and the wafer film are known parameters measured in advance, and the second layer is located between the first layer and the wafer film;

generating theoretical spectra under different given parameters of the second layer using a spectrum computation model with parameters of the first layer and the second layer; and determining a parameter range of the second layer based on the theoretical spectra and the measured spectrum.

Optionally, the theoretical spectra and the measured spectrum respectively include a curve of a correspondence between wavelength and reflectance.

Optionally, the step of determining a parameter range of the second layer based on the theoretical spectra and the measured spectrum includes:

obtaining a matching degree threshold;

computing a matching degree between the theoretical spectra and the measured spectrum under the different given parameters of the second layer, and determining the parameter range based on the parameters of the second layer corresponding to a theoretical spectrum whose computed matching degree meets the matching degree threshold.

Optionally, the parameters of the second layer include a refractive index, a thickness, and a mapping relationship between the refractive index and the thickness based on the spectrum computation model.

Optionally, the step of determining a parameter range of the second layer includes:

solving a range of the refractive index and a range of the thickness corresponding to the second layer based on the mapping relationship between the refractive index and the thickness when the matching degree between the theoretical spectrum and the measured spectrum meets the matching degree threshold.

Optionally, the matching degree is a degree of fitting, and the degree of fitting K between the theoretical spectrum and the measured spectrum is computed as follows:

$$K = \sqrt[2]{\sum_{i=1}^{n}(x_{1i} - x_{2i})^2}$$

where $x_{1i}$ represents a value of an it data point in the measured spectrum, $x_{2i}$ represents a value of an $i^{th}$ data point in the theoretical spectrum under the given parameters of the second layer, and n represents a quantity of data points.

Optionally, the spectrum computation model includes the following parameters:

a refractive index $n_1$ of the first layer, a refractive index $n_2$ of the wafer film, a refractive index $n_3$ of the wafer substrate, a refractive index $n_4$ of the second layer, and a thickness $d_4$ of the second layer.

Optionally, the spectrum computation model includes:

$$R = r \cdot r^*,$$

where r represents a total reflection coefficient determined based on $n_1$, $n_2$, $n_3$, $n_4$, and $d_4$, $r^*$ represents a conjugate complex number of r, and R represents a reflectance.

Optionally, the total reflection coefficient r is computed as follows:

computing a reflection coefficient of an interface of each layer based on $n_1$, $n_2$, $n_3$, and $n_4$;

computing a phase thickness θ of the wafer film based on $n_2$, a wavelength λ, and a thickness $d_2$ of the wafer film;

computing a phase thickness α of the second layer based on $n_4$, the wavelength λ, and the thickness $d_4$; and computing the total reflection coefficient r based on the reflection coefficient of the interface of each layer, the phase thickness α, and the phase thickness θ.

Optionally, the reflection coefficient of the interface of each layer includes a reflection coefficient $r_2$ of an interface between the wafer film and the wafer substrate, a reflection coefficient $r_3$ of an interface between the first layer and the second layer, and a reflection coefficient $r_4$ of an interface between the second layer and the wafer film.

Optionally, the step of computing a reflection coefficient of an interface of each layer includes:

computing the reflection coefficient $r_2$ of the interface between the wafer film and the wafer substrate based on $n_2$ and $n_3$;

computing the reflection coefficient $r_3$ of the interface between the first layer and the second layer based on $n_1$ and $n_4$; and computing the reflection coefficient $r_4$ of the interface between the second layer and the wafer film based on $n_2$ and $n_4$.

Optionally, the step of computing the total reflection coefficient r includes:

computing an equivalent interface reflection coefficient $r_{equivalent}$ based on θ, $r_2$, and $r_4$; and computing the total reflection coefficient r based on α, $r_3$, and $r_{equivalent}$.

Optionally, the parameter range of the second layer is used for generating a spectrum library for in-situ measurement of film thickness of the wafer using an optical non-contact reflectance method.

Accordingly, the present invention provides a device for determining parameters of a near-surface dielectric layer in a wafer grinding scene, including: a processor and a memory connected to the processor, where the memory stores instructions that can be executed by the processor, and the instructions are executed by the processor to cause the processor to perform the method for determining parameters of a near-surface dielectric layer in a wafer grinding scene described above.

According to the method for determining parameters of a near-surface dielectric layer in the embodiments of the present invention, a wafer with a known wafer film thickness is used as a measurement object in a grinding scene, its spectrum is measured under the condition that the to-be-ground surface has the first layer and the second layer, and the spectrum has a deformation phenomenon, which is consistent with an actual model scene; and then the theoretical spectra under different given wafer parameters are computed using the constructed spectrum computation model, and the theoretical spectra also reflect the influence of the first layer and the second layer on the reflectivity. By comparing the theoretical spectra with the measured spectrum, the parameters of the second layer of the measurement object can be deduced, and these parameters can be used for building a reference spectrum library, thereby improving the accuracy of optical non-contact measurement of the wafer film thickness.

BRIEF DESCRIPTION OF THE DRAWINGS

To describe the technical solutions in the embodiments of the present invention or in the prior art more clearly, the following briefly describes the accompanying drawings needed for describing the embodiments or the prior art. Apparently, the accompanying drawings in the following description show some embodiments of the present invention, and those of ordinary skill in the art may further derive other accompanying drawings from these accompanying drawings without making creative efforts.

DETAILED DESCRIPTION OF THE EMBODIMENTS

An explicit and complete description of the technical solutions in the present invention will be given below in conjunction with the accompanying drawings. Apparently, the described embodiments are part, but not all, of the embodiments of the present invention. Based on the embodiments in the present invention, all other embodiments obtained by those of ordinary skill in the art without making creative efforts shall fall within the protection scope of the present invention.

In addition, the technical features involved in different embodiments of the present invention described below can be combined with each other as long as they do not conflict with each other.

An embodiment of the present invention provides a method for determining parameters of a near-surface dielectric layer in a wafer grinding scene, which can be executed by an electronic device such as a computer or server, including the following operation steps:

obtaining a measured spectrum in a state in which a surface of a wafer has a first layer and a second layer, where the wafer includes a wafer substrate and a wafer film. The state of having the first layer and the second layer refers to a state in which the wafer is placed in a to-be-ground scene, and slurry is added to a to-be-ground surface of the wafer so that the first layer and the second layer are formed on the surface of the wafer, where the first layer and the second layer are located between bulk water and the wafer film, the second layer is located between the first layer and the wafer film, and the first layer may be a layer formed by air.

The measured spectrum may be data of a correspondence between wavelength and reflectance collected by a spectrometer, and can be expressed by a curve, in other words, the measured spectrum may be a curve of a correspondence between wavelength and reflectance. In this embodiment, the correspondence between wavelength and reflectance can be deformed by technologies in the art according to actual needs, and for those of ordinary skill in the art, other changes or modifications in different forms can be made on the basis of the above description. It is neither necessary nor impossible to exhaust all the embodiments herein. However, any obvious changes or modifications derived thereof still fall within the protection scope of the present invention.

Figure 1:
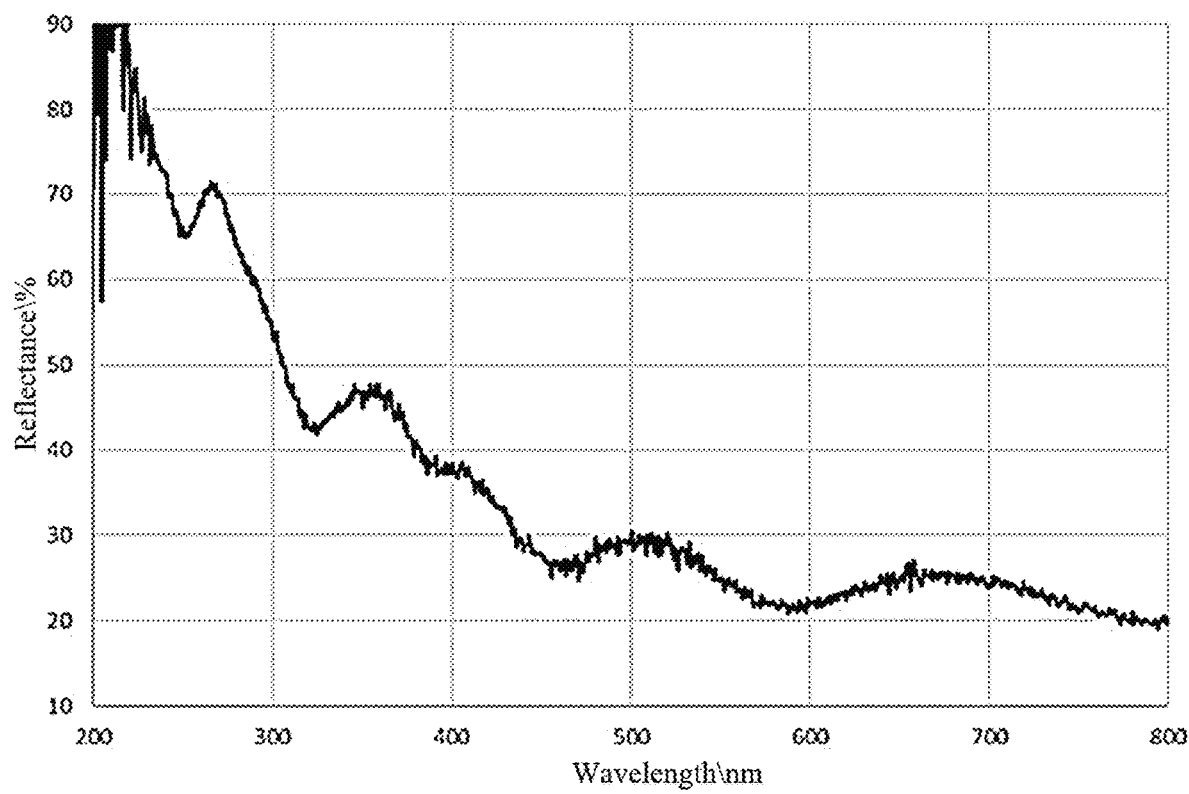
FIG. 1 is a measured spectral curve according to an embodiment of the present invention.

The wafer in this embodiment includes a wafer substrate (silicon) and a wafer film (silicon oxide), where materials of the wafer substrate and the wafer film, and a thickness of the wafer film are known parameters measured in advance. The thickness of the wafer film may be measured in a manner of off-line measurement (for example, using a microspectroscopic film thickness meter) before adding the slurry to the surface. FIG. 1 is a measured spectral curve at a wafer film thickness of 700 nm, where a wavelength range is 200-800 nm, and the curve shows a reflectance of light in this wavelength range.

Generating theoretical spectra under different given parameters of the second layer using a spectrum computation model with parameters of the first layer and the second layer.

Optionally, the spectrum computation model constructed in this embodiment involves a refractive index $n_1$ of the first layer, a refractive index $n_2$ of the wafer film, a refractive index $n_3$ of the wafer substrate, a refractive index $n_4$ of the second layer, and a thickness $d_4$ of the second layer.

$n_1$, $n_2$, and $n_3$ may be measured by instruments and are fixed values; $d_4$ and $n_4$ are given parameters; and a value range of the wavelength is consistent with a wavelength range in the measured spectrum.

For example, $d_4$=[0.001, 0.002, 0.003, . . . , 3], indicating that the value range is 0.001-3 with a step of 0.001 expressed in nm. For each $d_4$, a reflectance at a wavelength of 200-800 nm can be computed using the constructed spectrum computation model. In other words, when $d_4$=0.001, the reflectance at the wavelength $\lambda$=[200, 800] is computed, and a theoretical spectrum formed thereby is denoted by $R_{0.001}$; when $d_4$=0.002, the reflectance at the wavelength $\lambda$=[200, 800] is computed, and a theoretical spectrum formed thereby is denoted by $R_{0.002}$; . . . ; and when $d_4$=3, the reflectance at the wavelength $\lambda$=[200, 800] is computed, and a theoretical spectrum formed thereby is denoted by $R_3$.

Determining a parameter range of the second layer based on the theoretical spectra and the measured spectrum. $d_4$ and $n_4$ in the spectrum computation model are independent variables, and the theoretical spectra computed under different values of $d_4$ and $n_4$ are different. By comparing these theoretical spectra with the measured spectrum shown in FIG. 1, the values of $d_4$ and $n_4$ can be deduced, that is, a smaller range or a value can be determined from the given values of $d_4$ and $n_4$ respectively.

Figure 2:
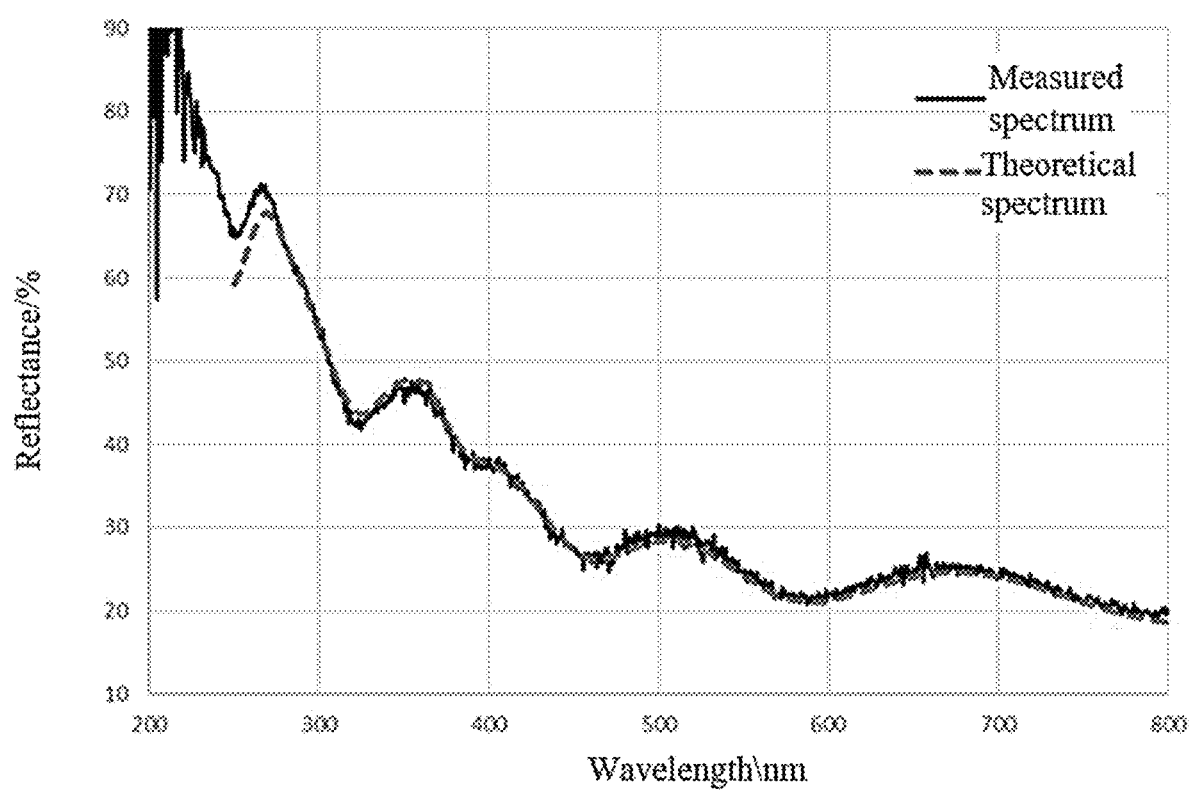
FIG. 2 is a comparison chart between a theoretical spectral curve and a measured spectral curve according to an embodiment of the present invention.

By comparing all the theoretical spectra with the measured spectrum one by one, one or more theoretical spectra most similar to the measured spectrum can be determined. FIG. 2 shows a curve of the theoretical spectrum (dotted line) and a curve of the measured spectrum (solid line). If a similarity between these two curves is high enough, the thickness and refractive index of the second class layer of the theoretical spectrum can be determined as determination results.

There are many methods to compute the similarity of the two curves, and there are many indexes to measure the similarity or the matching degree, such as a similarity method, a nonlinear regression method, and an FFT method. All theoretical spectral curves with the similarity being within a threshold range can be determined as sufficiently similar by presetting an absolute threshold. $d_4$ corresponding to these curves is the thickness range of the second layer, and $n_4$ corresponding to these curves is the refractive index range of the second layer. One or more curves with the highest similarity can also be screened out by comparing the similarity between all the theoretical spectral curves and the measured spectral curve by setting a relative threshold, and the corresponding $d_4$ and $n_4$ are the actual thickness or parameter range of the near-surface dielectric layer.

According to the method for determining parameters of a near-surface dielectric layer in the embodiments of the present invention, a wafer with a known wafer film thickness is used as a measurement object in a grinding scene, its spectrum is measured under the condition that the to-be-ground surface has the first layer and the second layer, and a curve of the spectrum has a deformation phenomenon, which is consistent with an actual model scene; and then the theoretical spectra under different given parameters of the second layer are computed using the constructed spectrum computation model, and the theoretical spectra also reflect the influence of the first layer and the second layer on the reflectance. By comparing the theoretical spectra with the measured spectrum, the parameters of the second layer of the measurement object can be deduced, and these parameters can be used for building a reference spectrum library, thereby improving the accuracy of optical non-contact measurement of the wafer film thickness.

The aforementioned spectrum computation model can be obtained by improvement on the basis of an existing spectrum computation model without introducing the second layer structure. Compared with a physical structure in the prior art, the physical structure in this solution adds a second layer between the wafer film and the first layer.

As an example, the spectrum computation model may be as follows:

$$R = r \cdot r^*,$$

where r represents a total reflection coefficient determined based on $n_1$, $n_2$, $n_3$, $n_4$, and $d_4$, $r^*$ represents a conjugate complex number of r, and R represents a reflectance. According to the above model, for each given $d_4$ and $n_4$, R under each $\lambda$ can be computed, thereby obtaining theoretical spectral data of each given parameter of the second layer.

In an embodiment, the total reflection coefficient r is computed as follows:

computing a reflection coefficient of an interface of each layer based on $n_1$, $n_2$, $n_3$, and $n_4$; computing a phase thickness $\theta$ of the wafer film based on $n_2$, a wavelength $\lambda$, and a thickness $d_2$ of the wafer film; computing a phase thickness $\alpha$ of the second layer based on $n_4$, the wavelength $\lambda$, and the thickness $d_4$; and computing the total reflection coefficient r based on the reflection coefficient of the interface of each layer, the phase thickness $\alpha$, and the phase thickness $\theta$.

Furthermore, the reflection coefficient of the interface of each layer includes a reflection coefficient $r_2$ of an interface between the wafer film and the wafer substrate, a reflection coefficient $r_3$ of an interface between the first layer and the second layer, and a reflection coefficient $r_4$ of an interface between the second layer and the wafer film.

The step of computing the reflection coefficient of the interface of each layer includes: computing the reflection coefficient $r_2$ of the interface between the wafer film and the wafer substrate based on $n_2$ and $n_3$; computing the reflection coefficient $r_3$ of the interface between the first layer and the second layer based on $n_1$ and $n_4$; and computing the reflection coefficient $r_4$ of the interface between the second layer and the wafer film based on $n_2$ and $n_3$.

The step of computing the total reflection coefficient r includes: computing an equivalent interface reflection coefficient $r_{equivalent}$ based on $\theta$, $r_2$, and $r_4$; and computing the total reflection coefficient r based on $\alpha$, $r_3$, and $r_{equivalent}$.

As an example, the reflection coefficient can be computed as follows:

$$r_2 = \frac{n_2 - n_3}{n_2 + n_3},$$

$$r_3 = \frac{n_1 - n_4}{n_1 + n_4},$$

$$r_4 = \frac{n_4 - n_2}{n_4 + n_2},$$

The phase thickness θ can be computed as follows:

$$\theta = \frac{4\pi n_2 d_2}{\lambda},$$

The phase thickness α can be computed as follows:

$$\alpha = \frac{4\pi n_4 d_4}{\lambda},$$

The equivalent interface reflection coefficient $r_{equivalent}$ can be computed as follows:

$$r_{equivalent} = \frac{r_4 + r_2 \cdot e^{i \cdot 2\theta}}{1 + r_4 \cdot r_2 \cdot e^{i \cdot 2\theta}},$$

The total reflection coefficient r can be computed as follows:

$$r = \frac{r_3 + r_{equivalent} \cdot e^{i \cdot 2\alpha}}{1 + r_3 \cdot r_{equivalent} \cdot e^{i \cdot 2\alpha}}$$

where i is an imaginary unit, and e is a natural constant.

For the above computational formulas, simple modifications may be made according to actual needs, for example, adding a preset coefficient or weight to one of the computational formulas, or the like. For those of ordinary skill in the art, other changes or modifications in different forms can be made on the basis of the above description. It is neither necessary nor impossible to exhaust all the computational formulas herein. However, any obvious changes or modifications derived thereof still fall within the protection scope of the present invention.

In an embodiment, the step of determining a parameter range of the second layer based on the theoretical spectra and the measured spectrum includes:
obtaining a matching degree threshold, which is set manually; computing a matching degree between the theoretical spectra and the measured spectrum under the different given parameters of the second layer; and determining the parameter range based on the parameters of the second layer corresponding to a theoretical spectrum whose computed matching degree meets the matching degree threshold.

By screening the theoretical spectra based on the matching degree threshold, the accuracy of thickness results of the near-surface dielectric layer can be controlled manually.

Furthermore, the parameters of the second layer in this embodiment include the refractive index $n_4$ and the thickness $d_4$, and there is a mapping relationship between $n_4$ and $d_4$. A range of the refractive index and a range of the thickness corresponding to the second layer are solved based on the mapping relationship between the refractive index $n_4$ and the thickness $d_4$ when the matching degree between the theoretical spectrum and the measured spectrum meets the matching degree threshold.

In an embodiment, a degree of fitting K between the theoretical spectrum and the measured spectrum is computed, and the degree of fitting K is used as a measurement index of the matching degree of the two curves:

$$K = \sqrt[2]{\sum_{i=1}^{n}(x_{1i} - x_{2i})^2}$$

where $x_{1i}$ represents a value of an it data point in the measured spectrum, $x_{2i}$ represents a value of an $i^{th}$ data point in the theoretical spectrum under the given parameters of the second layer, and n represents a quantity of data points.

The above method is least square fitting, and the degree of fitting K is also called a Euclidean distance between the two spectra. The larger the degree of fitting K, the lower the similarity/matching degree, and the smaller the degree of fitting K, the higher the similarity/matching degree.

The parameter range of the second layer may be controlled by requiring the degree of fitting through a preset threshold. The smaller the K value, the higher the similarity between the two spectra, which makes the detection resolution of the thickness of a to-be-measured film higher and the parameter range of the second layer smaller.

When the thickness $d_4$ and the refractive index $n_4$ are used for generating a reference spectrum library, any numerical value can be selected from the above range as a fixed parameter. According to experimental data, when the values of $d_4$ and $n_4$ are in an appropriate range, different values have little influence on the spectra, or it can be construed that the similarity between the spectra generated by different values in this range is extremely high, so it is feasible to select any value as the fixed parameter.

Those skilled in the art should understand that the embodiments of the present invention may be provided as a method, a system, or a computer program product. Therefore, the present invention may be in the form of a hardware-only embodiment, a software-only embodiment, or an embodiment with a combination of software and hardware. Moreover, the present invention may be in the form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that a computer program instruction may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may be stored in a computer readable memory that can instruct the computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operation steps are performed on the computer or another programmable device to generate computer-implemented processing. Therefore, the instructions executed on the computer or another programmable device are used to provide steps for implementing a specific function in one or more processes in the flowcharts and/or in one or more blocks in the block diagrams.

Obviously, the above embodiments are merely examples for clear description, rather than limit the implementation. For those of ordinary skill in the art, other changes or modifications in different forms can be made on the basis of the above description. It is neither necessary nor impossible to exhaust all the embodiments herein. However, any obvious changes or modifications derived thereof still fall within the protection scope of the present invention.

What is claimed is:

1. A method for determining parameters of a near-surface dielectric layer in a wafer grinding scene, performed by a system comprising a spectrometer and a processor connected to the spectrometer,
wherein the spectrometer is configured for:
obtaining a measured spectrum in a state in which a surface of a wafer has a first layer and a second layer, wherein the wafer comprises a wafer substrate and a wafer film, parameters of the wafer substrate and the wafer film are known parameters measured in advance, the second layer is located between the first layer and the wafer film, the state of having the first layer and the second layer refers to a state in which the wafer is placed in a to-be-ground scene, slurry is added to a to-be-ground surface of the wafer so that the first layer and the second layer are formed on the surface of the wafer, and the first layer and the second layer are located between a surface of the slurry and the wafer film;
wherein the processor is configured for:
generating theoretical spectra under different given parameters of the second layer using a spectrum computation model with parameters of the first layer and the second layer, wherein the parameters of the spectrum computation model comprise a refractive index $n_1$ of the first layer, a refractive index $n_2$ of the wafer film, a refractive index $n_3$ of the wafer substrate, a refractive index $n_4$ of the second layer, and a thickness $d_4$ of the second layer; and
obtaining a matching degree threshold, computing a matching degree between the theoretical spectra and the measured spectrum under the different given parameters of the second layer, and determining a parameter range of the second layer based on the parameters of the second layer corresponding to a theoretical spectrum whose computed matching degree meets the matching degree threshold; and
wherein the parameter range of the second layer is used for generating a spectrum library for in-situ measurement of film thickness of the wafer using an optical non-contact reflectance method, and grinding the wafer based on the generated spectrum library while conducting in-situ film thickness measurement of the wafer.

2. The method of claim 1, wherein the theoretical spectrum and the measured spectrum respectively comprise a curve of a correspondence between a wavelength and a reflectance.

3. The method of claim 1, wherein the determined parameters of the second layer comprise a refractive index, a thickness, and a mapping relationship between the refractive index and the thickness based on the spectrum computation model.

4. The method of claim 3, wherein the step of determining the parameter range of the second layer comprises:
solving a range of the refractive index and a range of the thickness corresponding to the second layer based on the mapping relationship between the refractive index and the thickness when the matching degree between the theoretical spectrum and the measured spectrum meets the matching degree threshold.

5. The method of claim 1, wherein the matching degree is a degree of fitting, and the degree of fitting K between the theoretical spectrum and the measured spectrum is computed as follows:

$$K = \sqrt[2]{\sum_{i=1}^{n}(x_{1i}-x_{2i})^2}$$

wherein $x_{1i}$ represents a value of an $i^{th}$ data point in the measured spectrum, $x_{2i}$ represents a value of an $i^{th}$ data point in the theoretical spectrum under the given parameters of the second layer, and n represents a quantity of data points.

6. The method of claim 1, wherein the spectrum computation model comprises:

$R = r \cdot r^*$, wherein r represents a total reflection coefficient determined based on $n_1$, $n_2$, $n_3$, $n_4$, and $d_4$, $r^*$ represents a conjugate complex number of r, and R represents a reflectance.

7. The method of claim 6, wherein the total reflection coefficient r is computed as follows:
computing a reflection coefficient of an interface of each layer based on $n_1$, $n_2$, $n_3$, and $n_4$;
computing a phase thickness $\theta$ of the wafer film based on $n_2$, a wavelength $\lambda$, and a thickness $d_2$ of the wafer film;
computing a phase thickness $\alpha$ of the second layer based on $n_4$, the wavelength $\lambda$, and the thickness $d_4$; and
computing the total reflection coefficient r based on the reflection coefficient of the interface of each layer, the phase thickness $\alpha$, and the phase thickness $\theta$.

8. The method of claim 7, wherein the reflection coefficient of the interface of each layer comprises a reflection coefficient $r_2$ of an interface between the wafer film and the wafer substrate, a reflection coefficient $r_3$ of an interface between the first layer and the second layer, and a reflection coefficient $r_4$ of an interface between the second layer and the wafer film.

9. The method of claim 8, wherein the step of computing the reflection coefficient of the interface of each layer comprises:
computing the reflection coefficient $r_2$ of the interface between the wafer film and the wafer substrate based on $n_2$ and $n_3$;
computing the reflection coefficient $r_3$ of the interface between the first layer and the second layer based on $n_1$ and $n_4$; and computing the reflection coefficient $r_4$ of the interface between the second layer and the wafer film based on $n_2$ and $n_4$.

10. The method of claim 8, wherein the step of computing the total reflection coefficient r comprises:
   computing an equivalent interface reflection coefficient $r_{equivalent}$ based on θ, $r_2$, and $r_4$; and
   computing the total reflection coefficient r based on α, $r_3$, and $r_{equivalent}$.

11. A device for determining parameters of a near-surface dielectric layer in a wafer grinding scene, comprising: a spectrometer and a processor connected to the spectrometer,
   wherein the spectrometer is configured for:
      obtaining a measured spectrum in a state in which a surface of a wafer has a first layer and a second layer, wherein the wafer comprises a wafer substrate and a wafer film, parameters of the wafer substrate and the wafer film are known parameters measured in advance, the second layer is located between the first layer and the wafer film, the state of having the first layer and the second layer refers to a state in which the wafer is placed in a to-be-ground scene, slurry is added to a to-be-ground surface of the wafer so that the first layer and the second layer are formed on the surface of the wafer, and the first layer and the second layer are located between a surface of the slurry and the wafer film;

wherein the processor is configured for:
      generating theoretical spectra under different given parameters of the second layer using a spectrum computation model with parameters of the first layer and the second layer, wherein the parameters of the spectrum computation model comprise a refractive index $n_1$ of the first layer, a refractive index $n_2$ of the wafer film, a refractive index $n_3$ of the wafer substrate, a refractive index $n_4$ of the second layer, and a thickness $d_4$ of the second layer; and
      obtaining a matching degree threshold, computing a matching degree between the theoretical spectra and the measured spectrum under the different given parameters of the second layer, and determining a parameter range of the second layer based on the parameters of the second layer corresponding to a theoretical spectrum whose computed matching degree meets the matching degree threshold; and
   wherein the parameter range of the second layer is used for generating a spectrum library for in-situ measurement of film thickness of the wafer using an optical non-contact reflectance method, and the device being configured for grinding of the wafer based on the generated spectrum library while conducting in-situ film thickness measurement of the wafer.

* * * * *